(12) United States Patent
Zhang et al.

(10) Patent No.: US 9,708,199 B2
(45) Date of Patent: Jul. 18, 2017

(54) GRAFTED MEMBRANES AND SUBSTRATES HAVING SURFACES WITH SWITCHABLE SUPEROLEOPHILICITY AND SUPEROLEOPHOBICITY AND APPLICATIONS THEREOF

(71) Applicants: Lianbin Zhang, Thuwal (SA); Peng Wang, Thuwal (SA)

(72) Inventors: Lianbin Zhang, Thuwal (SA); Peng Wang, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 669 days.

(21) Appl. No.: 13/628,679

(22) Filed: Sep. 27, 2012

(65) Prior Publication Data

US 2013/0264287 A1 Oct. 10, 2013

Related U.S. Application Data

(60) Provisional application No. 61/540,361, filed on Sep. 28, 2011.

(51) Int. Cl.
*C02F 1/40* (2006.01)
*D06M 11/79* (2006.01)
(Continued)

(52) U.S. Cl.
CPC ............... *C02F 1/40* (2013.01); *B01D 69/02* (2013.01); *B01D 71/70* (2013.01); *B01D 71/78* (2013.01);
(Continued)

(58) Field of Classification Search
None
See application file for complete search history.

(56) References Cited

U.S. PATENT DOCUMENTS 3,673,272 A 6/1972 Dean
2002/0172716 A1\* 11/2002 Walt ..................... A61K 9/5138
424/491

(Continued)

FOREIGN PATENT DOCUMENTS

CN 1569933 A 1/2005
CN 101537316 9/2009
(Continued)

OTHER PUBLICATIONS

International Search Report and Written Opinion issued May 30, 2013, during prosecution of International Application No. PCT/IB2012/002560.
(Continued)

*Primary Examiner* — Krishnan S Menon
(74) *Attorney, Agent, or Firm* — Billion & Armitage; Benjamin Armitage

(57) ABSTRACT

Disclosed herein are surface-modified membranes and other surface-modified substrates exhibiting switchable oleophobicity and oleophilicity in aqueous media. These membranes and substrates may be used for variety of applications, including controllable oil/water separation processes, oil spill cleanup, and oil/water purification. Also provided are the making and processing of such surface-modified membranes and other surface-modified substrates.

47 Claims, 9 Drawing Sheets

(51) Int. Cl.

| | | |
|---|---|---|
| B01D 71/70 | (2006.01) | |
| C08J 9/36 | (2006.01) | |
| C09C 1/30 | (2006.01) | |
| B82Y 30/00 | (2011.01) | |
| C09K 3/32 | (2006.01) | |
| C08G 81/02 | (2006.01) | |
| B01D 69/02 | (2006.01) | |
| B01D 71/78 | (2006.01) | |
| D06M 13/513 | (2006.01) | |
| D06M 15/356 | (2006.01) | |
| D06M 15/643 | (2006.01) | |

(52) U.S. Cl.
CPC .............. *B82Y 30/00* (2013.01); *C08G 81/02* (2013.01); *C08J 9/365* (2013.01); *C09C 1/3081* (2013.01); *C09K 3/32* (2013.01); *D06M 11/79* (2013.01); *D06M 13/513* (2013.01); *D06M 15/3562* (2013.01); *D06M 15/643* (2013.01); *B01D 2325/36* (2013.01); *B01D 2325/38* (2013.01); *C01P 2004/03* (2013.01); *C01P 2004/04* (2013.01); *C01P 2004/13* (2013.01); *C01P 2004/16* (2013.01); *C01P 2004/17* (2013.01); *C01P 2004/61* (2013.01); *C01P 2004/62* (2013.01); *C01P 2004/64* (2013.01); *C01P 2006/16* (2013.01); *C01P 2006/19* (2013.01); *C08J 2201/036* (2013.01); *C08J 2201/038* (2013.01); *C08J 2375/04* (2013.01); *C08J 2483/10* (2013.01); *Y10T 428/24997* (2015.04); *Y10T 428/249991* (2015.04); *Y10T 428/31598* (2015.04); *Y10T 428/31612* (2015.04); *Y10T 428/31663* (2015.04); *Y10T 442/10* (2015.04); *Y10T 442/2172* (2015.04)

(56) References Cited

U.S. PATENT DOCUMENTS

| | | | |
|---|---|---|---|
| 2004/0043508 A1 | 3/2004 | Frutos et al. | |
| 2013/0112605 A1* | 5/2013 | Wyndham | B01J 20/28054 210/198.3 |
| 2013/0231438 A1* | 9/2013 | Kim | B82Y 10/00 524/500 |

FOREIGN PATENT DOCUMENTS

| | | |
|---|---|---|
| JP | 2002346560 | 12/2002 |
| WO | WO 2007/127722 | 11/2007 |
| WO | WO 2009/025900 | 2/2009 |
| WO | WO 2010/006457 | 1/2010 |

OTHER PUBLICATIONS

Chen et al., "Thermal-responsive hydrogel surface: tunable wettability and adhesion to oil at the water/solid interface", Soft Matter, 2010, No. 6, pp. 2708-2712.

Motornov et al., "Chemical Gating with Nanostructured Responsive Polymer Brushes: Mixed Brush versus Homopolymer Brush", American Chemical Society, 2008, vol. 2, No. 1, pp. 41-52.

Motornov et al., "Stimuli-Responsive Colloidal Systems from Mixed Brush-Coated Nanoparticles", Advance Functional Materials, 2007, vol. 17, pp. 2307-2314.

Tian et al., "Photo-induced water-oil separation based on switchable superhydrophobicity-superhydrophilicity and underwater superoleophobicity of the aligned ZnO nanorod array-coated mesh films" Journal of Materials Chemistry, 2012.

Xue et al., "A Novel Superhydrophilic and Underwater Superoleophobic Hydrogel-Coated Mesh for Oil/Water Separation" Advanced Materials, 2011, XX, pp. 1-4.

Zhang et al. "Wettability switching between high hydrophilicity at low pH and high hydrophobicity at high pH on surface based on pH-responsive polymer" Chemistry Communications, 2008, pp. 119-1201.

Zhang et al., "Remotely Controllable Liquid Marbles", Advanced Materials, 2012, No. 24, pp. 4756-4760.

Zhang et al., "Smart surfaces with switchable superoleophilicity and superoleophobicity in aqueous media: toward controllable oil/water separation", NPG Asia Materials, 2012, vol. 4, No. e8, pp. 1-8.

Ulbricht, "Advanced functional polymer membranes," *Polymer*, 47(7):2217-2262, 2006.

Wandera et al., "Stimuli-responsive membranes," *Journal of Membrane Science*, 357:6-35, 2010.

Xu, et al., "RAFT Polymerization Preparation Amphiphilic Block Copolymers and its Application" Journal of Hunan Univeristy (Natural Science) 37(2): 56-59, 2010. (English Abstract Provided).

Shi, et al., "Advance of smart surfaces with controllable wettability" Chinese Journal of Materials Research. 22(6): 561-571, 2008. (English Abstract Provided).

\* cited by examiner

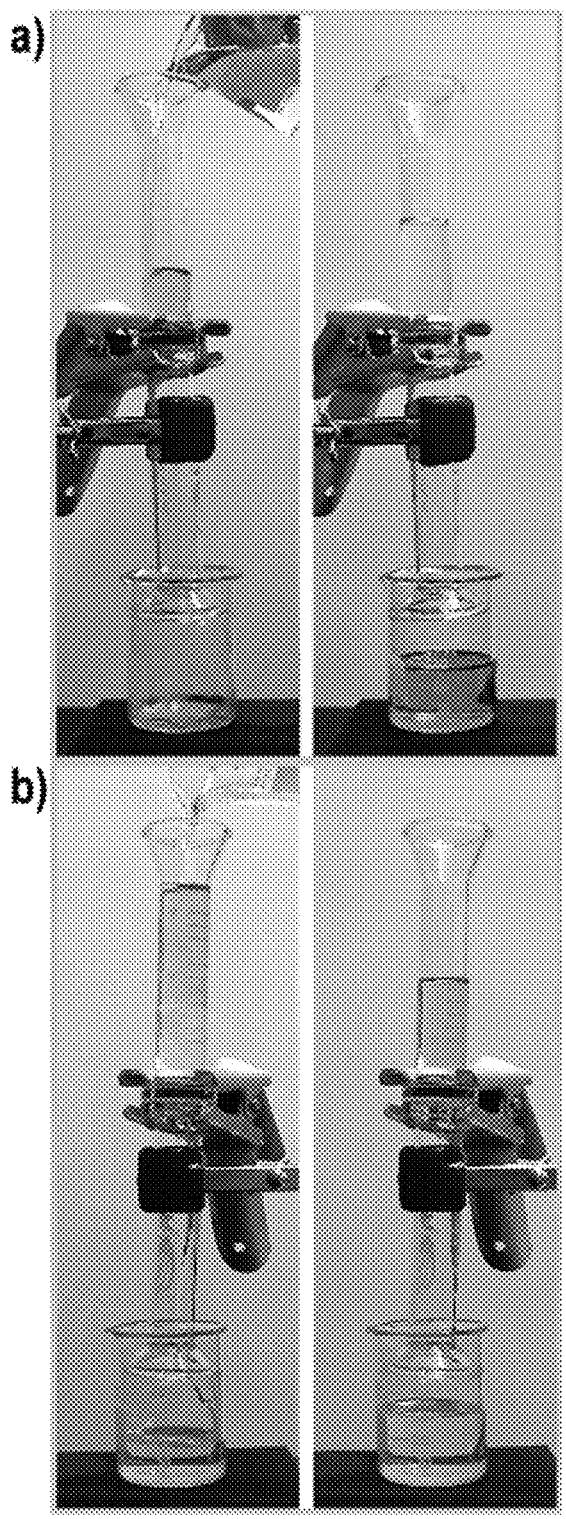
FIG. 7a & b

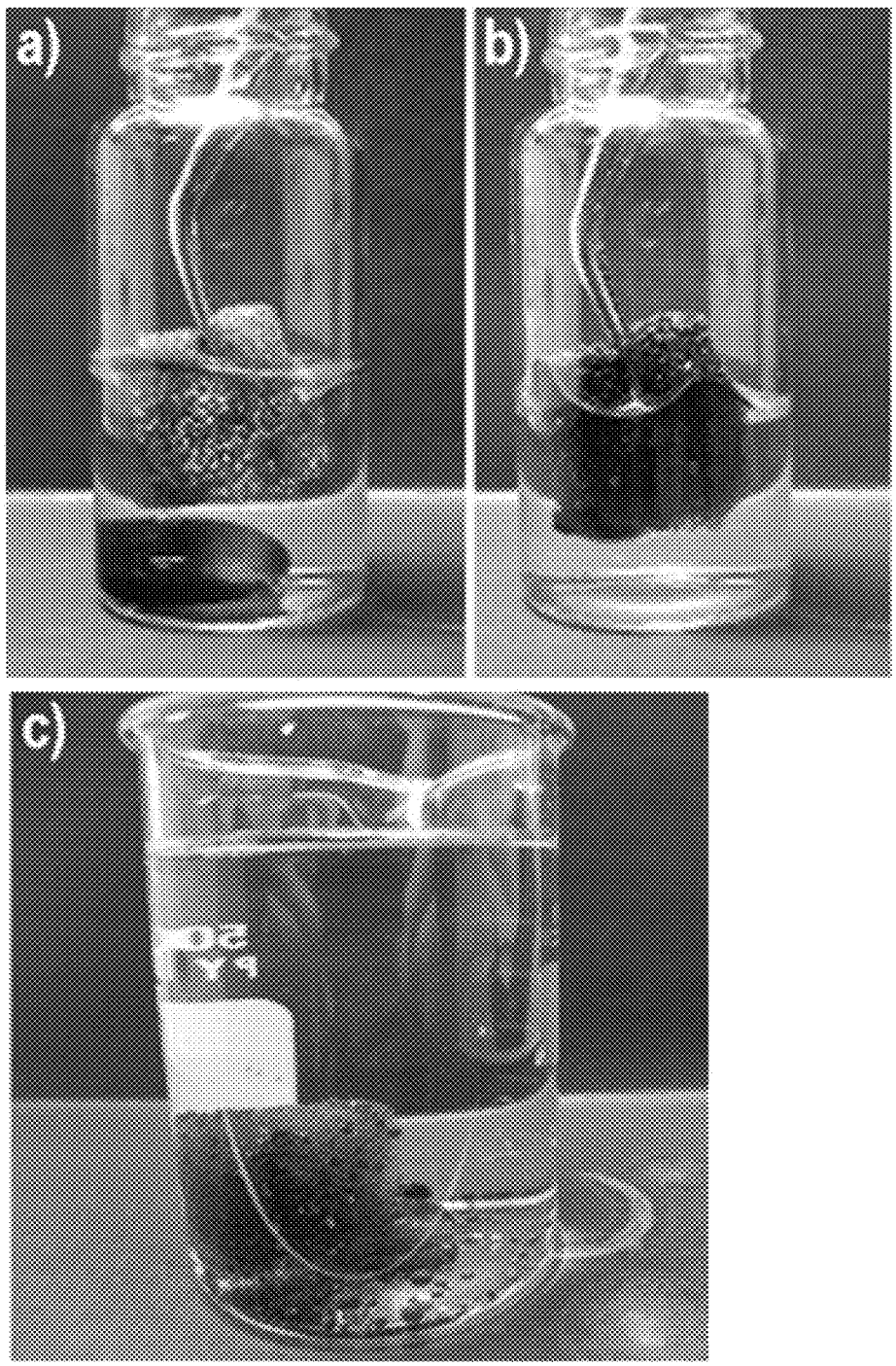
FIG. 8a-c

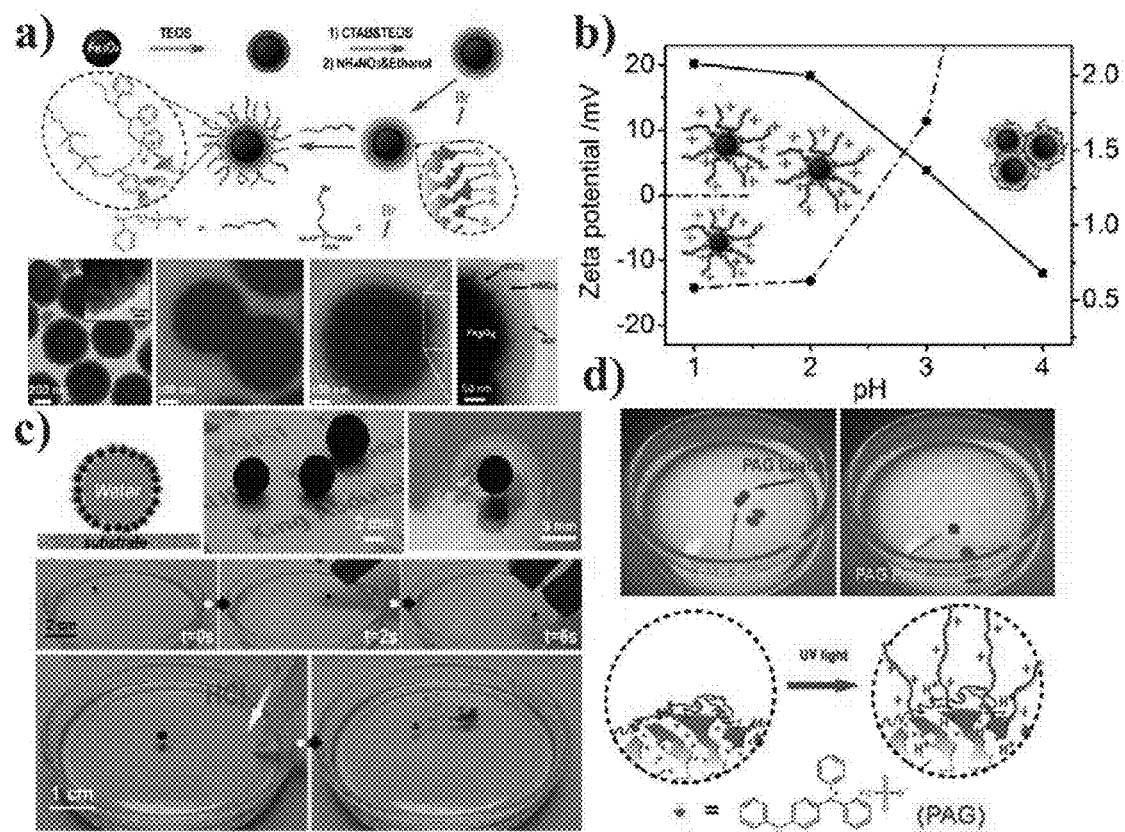
FIG. 9a-d

GRAFTED MEMBRANES AND SUBSTRATES HAVING SURFACES WITH SWITCHABLE SUPEROLEOPHILICITY AND SUPEROLEOPHOBICITY AND APPLICATIONS THEREOF

This application claims priority to U.S. Provisional Patent Application Ser. No. 61/540,361, filed Sep. 28, 2011, which application is incorporated by reference herein in its entirety.

BACKGROUND OF THE INVENTION

Field of the Invention

The present invention relates generally to making and processing of membranes, and other materials and substrates with modified surfaces and/or switchable oleophilicity and oleophobicity in aqueous media. Also provided is the making and processing of such surface-modified membranes and other surface-modified substrates.

Description of Related Art

Over millions of years of evolution, many marine animals such as fish have developed skins capable of protecting them from marine fouling, which are accomplished by combining micro- and nanoscaled hierarchical structures and suitable surface chemistry. Meanwhile it has been also revealed that fish can survive in oil-polluted water owing to their oleophobic scales. Oil wettability is of great importance for materials used in aqueous or non-aqueous media, because of its application in fields such as droplet manipulation in microfluidics, fabrication of antifouling filtration membranes, and oil/water separation. In such way, an oil-water-solid system instead of the air-water-solid system becomes the main concern.

Therefore, the design and preparation of surfaces with controllable oil wettability is highly desirable, particularly those that exhibit switchable oleophobicity in aqueous media.

SUMMARY OF THE INVENTION

In one aspect of the present disclosure, there are provided surface-modified materials comprising a substrate covalently bonded to a polymer, wherein the surface of the surface-modified material is oleophilic and/or hydrophobic under (or at or upon) a first condition and oleophobic and/or hydrophilic under (or at or upon) a second condition, and wherein the polymer comprises a wettability-responsive polymer, polymer segment or polymer block comprising poly(N-isopropylacrylamide), polyacrylamide, polypyrrole, polythiophene, polyaniline, poly(2-vinylpyridine), poly(4-vinylpyridine), poly(acrylic acid), poly(methylacrylic acid), poly(2-(diethylamino)ethylmethacrylate, poly(spiropyran methacrylate), poly(methacryloyl ethylene phosphate), poly[2-(methacryloyloxy)ethyl]-dimethyl(3-sulfopropyl)ammonium hydroxide, poly[2-(methacryloyloxy)-ethyl-trimethyl-ammonium chloride].

In some embodiments, the surface-modified material is oleophilic in aqueous media under a given condition. In some embodiments, the surface-modified material is oleophobic in aqueous media under a second condition. In some embodiments, the surface-modified material is oleophilic in air under a first condition and oleophobic in air under a second condition.

In some aspects, the switchable conditions involved in the switching from oleophilicity to oleophobicity include temperature, voltage, pH, light illumination, pressure, or a combination thereof.

In some embodiments, the surface-modified material is oleophilic in aqueous media at a first temperature and oleophobic in aqueous media at a second temperature. In some embodiments, the surface-modified material is oleophilic in air at a first temperature and oleophobic in air at a second temperature.

In some embodiments, the surface-modified material is oleophilic in aqueous media at a first pH and oleophobic in aqueous media at a second pH. In some embodiments, the surface-modified material is oleophilic in air at a first pH and oleophobic in air at a second pH. The pH values to which the surface-modified material may be subjected is from the range of 1 to 14, in particular aspects.

In some embodiments, the surface-modified material is oleophilic in aqueous media exposed to a first voltage and oleophobic in aqueous media exposed to a second voltage. In some embodiments, the surface-modified material is oleophilic in air exposed to a first voltage and oleophobic in air exposed to a second voltage. The values of voltage to which the surface-modified material is exposed to may be from 0.1V to 5,000 V, in certain cases.

In some embodiments, the surface-modified material is oleophilic in aqueous media exposed to a first illuminance and oleophobic in aqueous media exposed to a second illuminance. In some embodiments, the surface-modified material is oleophilic in air exposed to a first illuminance and oleophobic in air exposed to a second illuminance. The values of illuminance to which the surface-modified material is exposed to may be from 0.1 mW to 4.5 W with wavelength from 10 nm to 1,000 μm, in some embodiments.

In some embodiments, the surface-modified material is oleophilic in aqueous media under a first pressure and oleophobic in aqueous media under a second pressure. In some embodiments, the surface-modified material is oleophilic in air under a first pressure and oleophobic in air under a second pressure. The values of pressure to which the surface-modified material is exposed may be from 0.1 Pa to $10^6$ Pa, in particular embodiments. In some embodiments, the substrate comprises a plurality of imbedded nanostructures. In some embodiments, the nanostructures comprise nanoparticles, nanowires, nanorods, nanobelts, nanotubes, layered nanostructures, or a combination of these. In some embodiments, the nanostructures comprise silica, carbon, metal, metal oxide of the metal, hybrid of the metals, hybrid of the metal oxides, or polymers. In some embodiments, the nanostructures comprise silica. In some embodiments, the nanostructures have an average size from around 1 nm to 10 μm in at least one dimension. In some embodiments, the substrate does not comprise a plurality of imbedded nanostructures.

In some embodiments, the polymer comprises a block copolymer or mixed polymer. In some embodiments, the polymer comprises a block copolymer comprising two or three blocks. In some embodiments, the block copolymer comprises at least one wettability-responsive block. In some embodiments, the wettability-responsive block is poly(N-isopropylacrylamide), polyacrylamide, polypyrrole, polythiophene, polyaniline, poly(2-vinylpyridine), poly(4-vinylpyridine), poly(acrylic acid), poly(methylacrylic acid), poly(2-(diethylamino)ethylmethacrylate, poly(spiropyran methacrylate), poly(methacryloyl ethylene phosphate), poly[2-(methacryloyloxy)ethyl]-dimethyl(3-sulfopropyl)ammonium hydroxide, poly[2-(methacryloyloxy)-ethyl-trimethyl-ammonium chloride]. In some embodiments, the block copolymer comprises at least one hydrophobic block. In some embodiments, the hydrophobic block is poly(acrylonitrile), poly(phenyl methyl siloxane), polystyrene, poly(4- dimethylsilyl styrene), poly(4-methyl styrene), poly(dimethyl siloxane), polyethylene, polypropylene, poly(isobutylene), polyamide, poly(vinylidene fluoride).

In some embodiments, the polymer comprises a mixed polymer comprising at least one hydrophobic homogenous polymer and one polymer that is responsive to wettability. In some embodiments, the hydrophobic homogenous polymer is poly(acrylonitrile), poly(phenyl methyl siloxane), polystyrene, poly(4-dimethylsilyl styrene), poly(4-methyl styrene), poly(dimethyl siloxane), polyethylene, polypropylene, poly(isobutylene), polyamide, or poly(vinylidene fluoride). In some embodiments, the wettability-responsive polymer is poly(N-isopropylacrylamide), polyacrylamide, polypyrrole, polythiophene, polyaniline, poly(2-vinylpyridine), poly(4-vinylpyridine), poly(acrylic acid), poly(methylacrylic acid), poly(2-(diethylamino)ethylmethacrylate, poly(spiropyran methacrylate), poly(methacryloyl ethylene phosphate), poly[2-(methacryloyloxy)ethyl]-dimethyl(3-sulfopropyl)ammonium hydroxide, poly[2-(methacryloyloxy)-ethyl-trimethylammonium chloride], or mixtures of thereof.

In some embodiments, the substrate comprises a textile, a membrane, a polymer foam, a metal mesh, a metal foam, paper, glass, or nanostructures. In some embodiments, the textile, membrane, paper, metal mesh, metal foam or polymer foam has an average pore size in the range from 10 nm to 5,000 μm. In some embodiments, the substrate comprises a nonporous solid. In some embodiments, the textile, membrane, or polymer foam comprises cellulose, nylon, polyester, polyethylene terephthalate, polyurethane polylactide, polypropylene, polyethylene, polysulfone, polyamide, polyvinyl chloride, polytetrafluoroethylene, polycarbonate, polyacrylonitrile, polybutylene terephthalate, polyimide, polymethyl methacrylate, polyetheretherketone, polyetherketone, polyetherimide, polyethersulfone, polymethylpentene, polyoxymethylene, polyphthalamide, polyphenylene oxide, polyphenylene sulfide, ethylene propylene rubber, styrene butadiene rubber, ethylene propylene diene monomer rubber, chitosan, alginate, gelatin, poly(N-isopropylacrylamide), poly(4-vinylpyridine), poly(2-vinylpyridine), polydimethylsiloxane, poly(phenyl methyl siloxane), poly(4-dimethylsilyl styrene), poly(4-methyl styrene), poly(isobutylene), poly(N-isopropylacrylamide), polyacrylamide, polypyrrole, polythiophene, polyaniline, poly(acrylic acid), poly(methylacrylic acid), poly(2-(diethylamino)ethylmethacrylate, poly(spiropyran methacrylate), poly(methacryloyl ethylene phosphate), poly[2-(methacryloyloxy)ethyl]-dimethyl(3-sulfopropyl)ammonium hydroxide, poly[2-(methacryloyloxy)-ethyl-trimethylammonium chloride], polyvinylpyrrolidone, or mixtures or blends thereof. In some embodiments, the nanostructures as the substrate comprise nanoparticles, nanowires, nanorods, nanobelts, nanotubes, layered nanostructures, or a combination of these. In some embodiments, the nanostructures comprise silica, carbon, metal, metal oxide of the metal, hybrid of the metals, hybrid of the metal oxides, or polymers. In some embodiments, the nanostructures have an average size from around 1 nm to 100 μm in at least one dimension. In some embodiments, the nanostructures are porous. In some embodiments, the pore size of the porous nanostructures is between 0.3 nm to 200 nm. In some embodiments, the nanostructures are core-shell structures. In some embodiments, the core-shell structures comprise a magnetic core and a shell. In some embodiments, the core-shell structures comprise a hollow core and a shell. In some embodiments, the shell of the core-shell structures is porous. In some embodiments, the pore size of the porous shell is between 0.1 nm to 200 nm. In some embodiments, the shell of the core-shell structures is non-porous. In some embodiments, the core of the core-shell structures comprise silica, carbon, metal, metal oxide of the metal, hybrid of the metals, hybrid of the metal oxides, or polymers. In some embodiments, the shell of the core-shell structures comprise silica, carbon, metal, metal oxide of the metal, hybrid of the metals, hybrid of the metal oxides, or polymers.

In some embodiments, the metal mesh or metal foam comprises metal, metal oxide of the metal, metal chloride of the metal, metal hydroxide of the metal, alloy of the metals, hybrids of the metal oxides, hybrids of the metal chlorides, or hybrids of the metal hydroxides. In some embodiments, the metal comprises at least one of copper, iron, nickel, titanium, zinc, aluminum, silver, gold, palladium, platinum, silicon, vanadium, zirconium, cobalt, lead, chromium, barium, manganese, magnesium, yttrium, hafnium, thallium, indium, tin, arsenic, selenium, tellurium, bismuth, gallium, germanium, cadmium, iridium, tungsten, tantalum, niobium, molybdenum, strontium, calcium, an alloy thereof, an oxide thereof, or a mixture thereof.

In some embodiments, the nonporous solid comprises the same chemical compositions as the textile, filter membrane, or polymer foam. In some embodiments, the nonporous solid comprises the same chemical compositions as the metal mesh or metal foam.

In some embodiments, the polymer was bonded to the substrate through a grafting to and/or grafting from process. In some embodiments, the grafting from process comprises atom transfer radical polymerization or reversible addition-fragmentation chain transfer polymerization. In some embodiments, the grafting to process comprises functionalized polymer molecules reacting with complementary functional groups located on the substrate surface to form tethered chains. In some embodiments, the functional groups of the functionalized polymer molecules comprise amino groups, pyridyl groups, carboxy groups, and/or hydroxy groups. In some embodiments, the complementary functional groups located on the substrate surface comprise epoxy groups, amino groups, carboxy groups, hydroxy groups, haloalkyl groups. In some embodiments, the complementary functional groups are introduced on the substrate surface by a silanization reaction between a silane and the substrate. In some embodiments, the silane comprises an epoxy group, amino group, carboxy group, hydroxyl group, haloalkyl group.

In another aspect, there are provided surface-modified materials comprising a substrate covalently bonded to a polymer, wherein the substrate comprises a plurality of silanized silica particles and the polymer comprises a plurality of pyridyl groups.

In some embodiments, the substrate further comprises a textile, a metal mesh, paper, a metal foam or a polymer foam. In some embodiments, the substrate is a textile.

In some embodiments, the textile comprises cellulose. In some embodiments, the textile comprises polypropylene.

In some embodiments, the substrate comprises a polymer foam. In some embodiments, the polymer foam is a polyurethane.

In some embodiments, the silanized silica particles are further defined as silanized silica nanoparticles. In some embodiments, the silanized silica particles are silanized using (3-bromopropyl)trimethoxysilane. In some embodiments, the polymer is a poly(2-vinyl pyridine-b-dimethylsiloxane) block copolymer.

In another aspect, there are provided methods of separating oil from water, comprising:
a. obtaining a surface-modified material disclosed herein;
b. contacting the surface-modified material with a mixture comprising oil and water; and
c. adjusting a condition (temperature, voltage, pH, light illumination, pressure, or a combination thereof, for example) of the mixture until more oil than water adheres to the surface-modified material.

In another aspect, there are provided surface-modified materials comprising a substrate covalently bonded to a polymer, wherein the polymer comprises a plurality of nitrogen-containing heteroaryl$_{(C3-12)}$ groups, and wherein the surface of the surface-modified material is oleophilic under a first condition and oleophobic under a second condition. In some embodiments, the nitrogen-containing heteroaryl$_{(C3-12)}$ groups are further defined as pyridyl groups.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present disclosure. The invention may be better understood by reference to one of these drawings in combination with the detailed description of specific embodiments presented herein.

(FIG. 2a) and (FIG. 2b), raw textile fibers; (FIG. 2c) and (FIG. 2d), after the silica nanoparticles deposition and block copolymer grafting.

FIG. 4a depicts still images from video contact angle measurements for an acidic droplet (pH=1.0) applied on the surface of the as-modified textile in air. FIG. 4b provides contact angles as a function of pH values of the applied water droplets on block copolymer grafted textile. All the contact angles were calculated after a stable shape of droplet was reached on these surfaces. FIG. 4c shows time-dependent changes in contact angle for water droplets with different pH values: square, pH 1.0; triangle, 2.0; circle, pH 6.5. The inset in c) shows the details of time-dependent changes in contact angle for water of pH 1.0.

FIG. 5a depicts still images from video contact angle measurements for DCE droplet applied on the surface of the as-modified textile under water of pH 6.5. FIG. 5b shows photographs of DCE droplets upon contacting the block copolymer grafted textile under water of pH 6.5. FIG. 5c provides a schematic representation of oil wettability of the prepared surface in water of pH 6.5. FIG. 5d shows image of DCE droplet applied on the surface of the block copolymer grafted textile in water of pH 2.0. FIG. 5e shows a photograph of DCE droplets sitting on the block copolymer grafted textile under acidic water of pH 2.0. The DEC droplets were stained with oil red for clear observation. FIG. 5f provides a schematic representation of the oil wettability of the prepared surface in water of pH 2.0.

FIGS. 7a & b—Setups for controllable water/oil separation. FIG. 7a shows the modified textile was fixed between two glass tubes as a separation membrane, the mixture of gasoline and water was poured into the upper glass tube. Gasoline selectively passed through the textile, while water was repelled and held in the upper glass tube (right panel). FIG. 7b shows acidic water wetted textile for the water/oil separation process. Water selectively passed through the textile, while gasoline was repelled and held in the upper glass tube.

FIGS. 8a-c are photographs of the oil capture and release process. FIGS. 8a & b show oil absorption by the functionalized foam in neutral water. FIG. 8c shows the release of the absorbed oil in acidic water.

FIGS. 9a-d are examples showing the responsive core-shell nanostructures for the manipulation of small volumes of water. FIG. 9a shows the preparation scheme and TEM images of the responsive core-shell nanoparticles. FIG. 9b shows the pH-responsive property of the responsive nanoparticles. FIG. 9c shows the preparation of the liquid marbles with the responsive nanostructures and the controllable manipulation of the liquid marbles. FIG. 9d shows the UV triggered rupture of the liquid marble prepared using the PAG loaded functionalized nanoparticles.

DESCRIPTION OF ILLUSTRATIVE EMBODIMENTS

In some aspects of the present invention, there are provided materials, substrates and membranes comprising surfaces with switchable oleophilicity and oleophobicity in aqueous media in response to temperature, voltage, pH, light illumination, pressure, or a combination thereof. In some embodiments, this switch may be tied to pH, resulting in pH switchable oil wettability. As discussed in greater detail below, some of these surface-modified materials are oleophilic at neutral pH and oleophobic at acidic pH. These surfaces of membranes and substrates may be used in a variety of applications, including controllable oil/water separation processes, oil spill cleanup, oil/water purification, self-cleaning surfaces, microfluidics, liquid droplet manipulation, etc. Preparation of Surface-Modified Materials In one aspect of the present disclosure, there are provided surface-modified membranes and substrates by grafting or depositing on the surface different materials such as polymers or copolymers on their entirety or in combination with nanoparticles. The grafting processes disclosed herein and modifications thereof may be used to render a surface oleophilic or, in some embodiments, provide a surface with switchable and/or tunable oleophilicity. Hence, in some parts of this disclosure a mechanism and a method has been described whereby surface oleophilic properties can be interchangeable or switchable.

In some aspects of the present disclosure there are provided surface-modified membranes or other materials exhibiting switchable oleophilic/oleophobic properties. In some embodiments, these materials may be coated using a responsive block copolymer grafting strategy. For example, a layer of organo-silicon based molecules may be deposited on or bound to the surface of membrane or substrate, e.g., a textile or a polyurethane foam, to produce a surface with a hierarchical structure, which can amplify the wetting property of the surface. In some embodiments, a block copolymer comprising poly(2-vinyl pyridine) and polydimethylsiloxane segments (i.e., P2VP-b-PDMS) is then grafted onto the deposited silica nanoparticles. In some embodiments, the resulting surfaces of the modified membranes or other materials are hydrophobic at neutral pH and hydrophilic at acidic pH. Without being bound by theory, in the case of a poly(2-vinyl pyridine) copolymer, these properties result from the protonation/deprotonation of nitrogen-containing heteroaryl groups, e.g., pyridine groups, as a function of pH.

Generally, to achieve an extreme wetting behavior, a rough surface with hierarchically micro- and nanostructures is a prerequisite, as the wetting property can be amplified by the surface roughness at different length scales. Suitable substrates for these surface-modified membranes and other materials include textiles (fabrics), metal mesh, filter paper, metal, polymeric foams (e.g., polyurethane foams), glass and wood.

Figure 1:
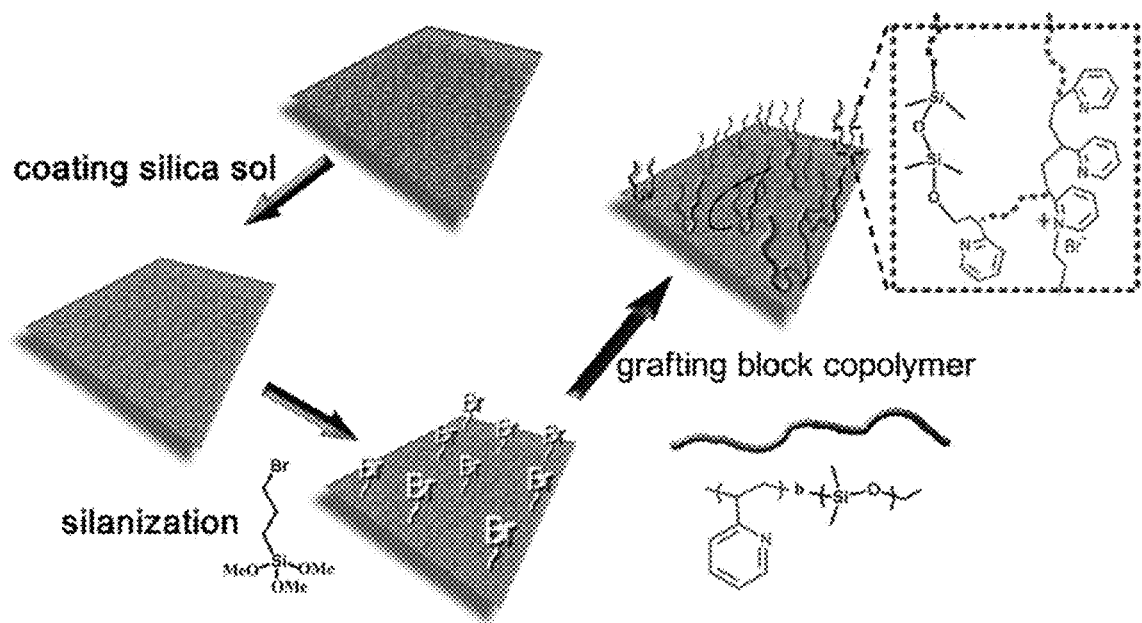
FIG. 1 depicts a scheme for the surface modification of textile fabrics.

Textile fabric may desirable in some embodiments because of its low cost, wide availability, chemical and mechanical robustness, and inherent fiber-textured structures which provide micro-structured roughness. The procedure for the preparation of the surface on the textile fabric with switchable oleophilicity and oleophobicity in aqueous medium is schematically illustrated in FIG. 1. Additional details related to a specific embodiment are provided in Example 2 below.

A three-dimensional porous polyurethane foam used for packaging can be also employed as a substrate for a P2VP-b-PDMS grafting procedure. Polyurethanes are reaction polymers. A urethane linkage is produced by reacting an isocyanate group, —N=C=O with a hydroxy group, and polyurethanes are produced by the polyaddition reaction of a polyisocyanate with a diol or a polyol, typically in the presence of a catalyst and other additives. A polyisocyanate is a molecule with two or more isocyanate functional groups, R—(N=C=O)$_n$, wherein n≥2 and a polyol is a molecule with two or more hydroxyl functional groups, R'—(OH)$_n$, wherein ≥2. The reaction product is a polymer containing the urethane linkage, —RNHCOOR'—. Polyurethanes may be produced by reacting a liquid isocyanate with a liquid blend of polyols, catalyst, and other additives. The blend of polyols and other additives may also be called a resin or a resin blend. In some embodiments, resin blend additives may include chain extenders, cross linkers, surfactants, flame retardants, blowing agents, pigments, and/or fillers. The choice of initiator, extender, and molecular weight of the polyol will typically affect its physical state, and the physical properties of the resulting polyurethane. Important characteristics of polyols are their molecular backbone, initiator, molecular weight, % primary hydroxyl groups, functionality, and viscosity.

In some embodiments, the polyurethane-based surface-modified membranes and other materials provided herein exhibit oleophilicity in neutral aqueous medium, and can be easily switched into oleophobic when wetted by acidic water. For example, a foam functionalized in this manner may be used for the oil-spill cleanup applications (FIGS. 8a & b and Example 5).

In some embodiments, surface-modified membranes or other materials have been impregnated with nanoparticles. In other embodiments, they have not been impregnated with nanoparticles. In some embodiments, the nanoparticles are silica. In other embodiments, nanoparticles other than silica are also contemplated. For example, such other nanoparticles include carbon nanotubes, nanoclays, zeolites, iron oxides, silver nanoparticles, copper oxides, titanium dioxide, carbon black, etc.

These methods can be further modified and optimized using the principles and techniques of chemistry and materials science as applied by a person skilled in the art.

Properties of Surface-Modified Membranes and Substrates

The surface-modified membranes and other materials provided herein exhibit a range of useful properties, and they may be used in a variety of applications, including oil spill cleanup, oil/water purification, etc. For example, surface-modified membranes and other materials that exhibit pH switchable wettability may be used to control underwater oil wettability of membranes other substrates and apparatuses. In some of the embodiments, the surface-modified membranes and other materials are oleophilic at neutral pH and oleophobic at acidic pH. As an example of an application, such a material, including a block polymer grafted textile fabric, may be used to provide controllable oil/water separation processes.

Figure 5:
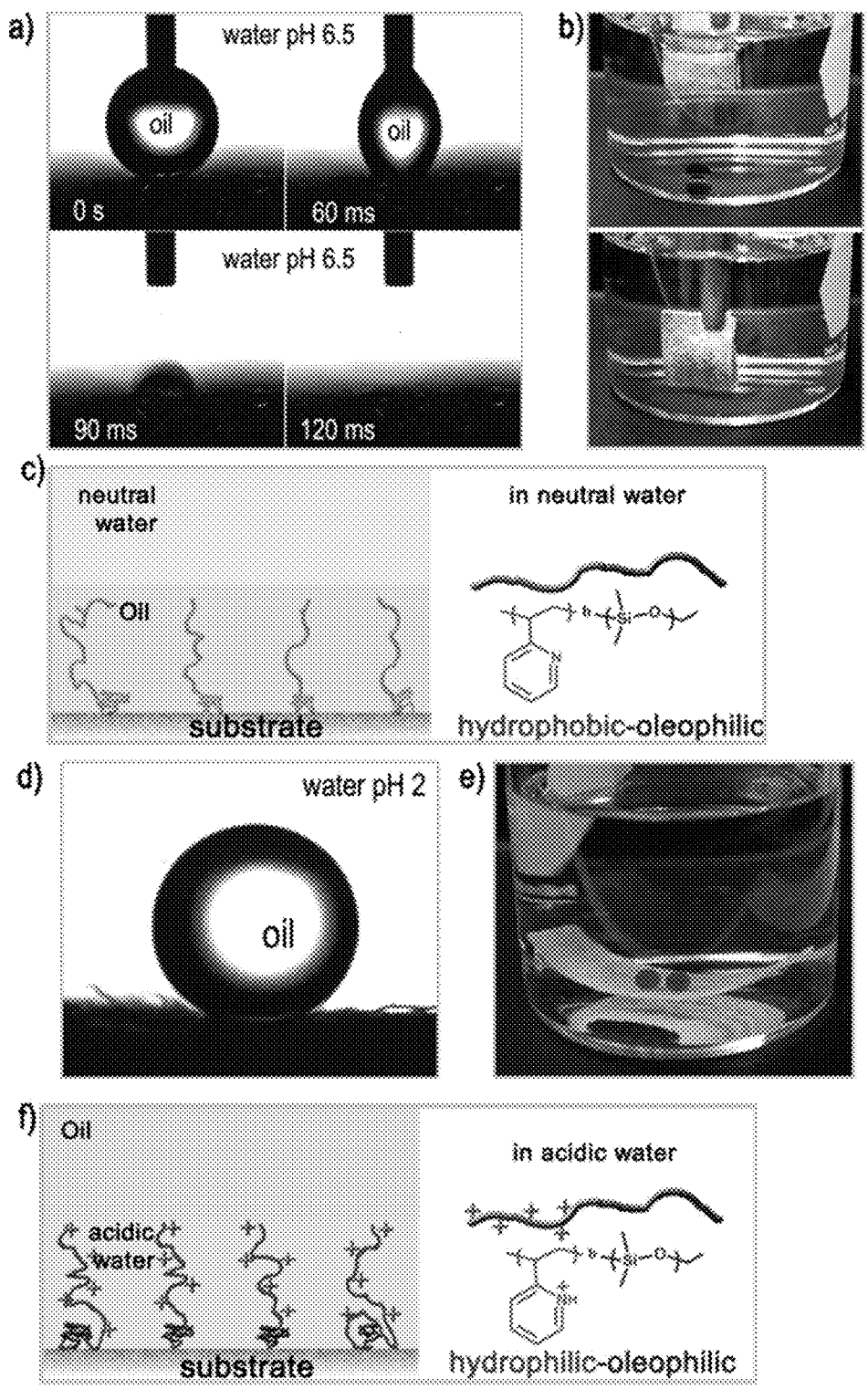
FIGS. 5a-f.

Wettability of a surface is typically governed by the surface chemistry as well as the surface roughness. In some embodiments, wettability is evaluated by contact angle measurements. The results discussed in the Example section confirm that P2VP-b-PDMS grafted textile exhibits tunable wetting behavior to water, depending on water pH, switching between hydrophobicity and hydrophilicity. The switchable water wettability of the surface is expected to affect its oil wettability in aqueous media. FIG. 5 presents the oil wettability of the P2VP-b-PDMS grafted textile under water of different pH values, with DCE representing an oil phase. On contact, the textile immediately sucked up the DCE droplets without leaving behind any residues. This simple experiment revealed that the block copolymer grafted membranes and substrates are promising sorbents for removing oil from water.

In some embodiments, the surface-modified membranes and other surface-modified materials provided herein are hydrophobic to water at pH≥3, which means the surface is nonwettable in these aqueous media. As a result, when the surface-modified material is immersed in neutral water, the surface is still covered with the oleophilic PDMS chains, and therefore once an oil droplet contacts the surface, oil wets the surface preferentially over water, owing to the oleophilic surface property (FIG. 5c).

In some embodiments, air can be trapped inside the rough grooves of surface-modified membranes and substrates when submerged in water. The as-prepared block copolymer grafted textile surface is hydrophobic in air. A complex interfacial system, i.e., a four phase system (air-solid-oil-water), will then be formed when an oil droplet contacts such a surface.

In some embodiments, when the surface-modified membranes and substrates provided herein are immersed in acidic water, for example pH of 2.0, the oil wettability of the surface reversed completely. As has been discussed in greater detail below, the present invention provides surface-modified membranes and substrates that are hydrophilic in acidic water. Under such conditions, water can readily wet the surface and diffuse into micro- and nanostructures of the textile, forming a water trapped composite interface.

Figure 6:
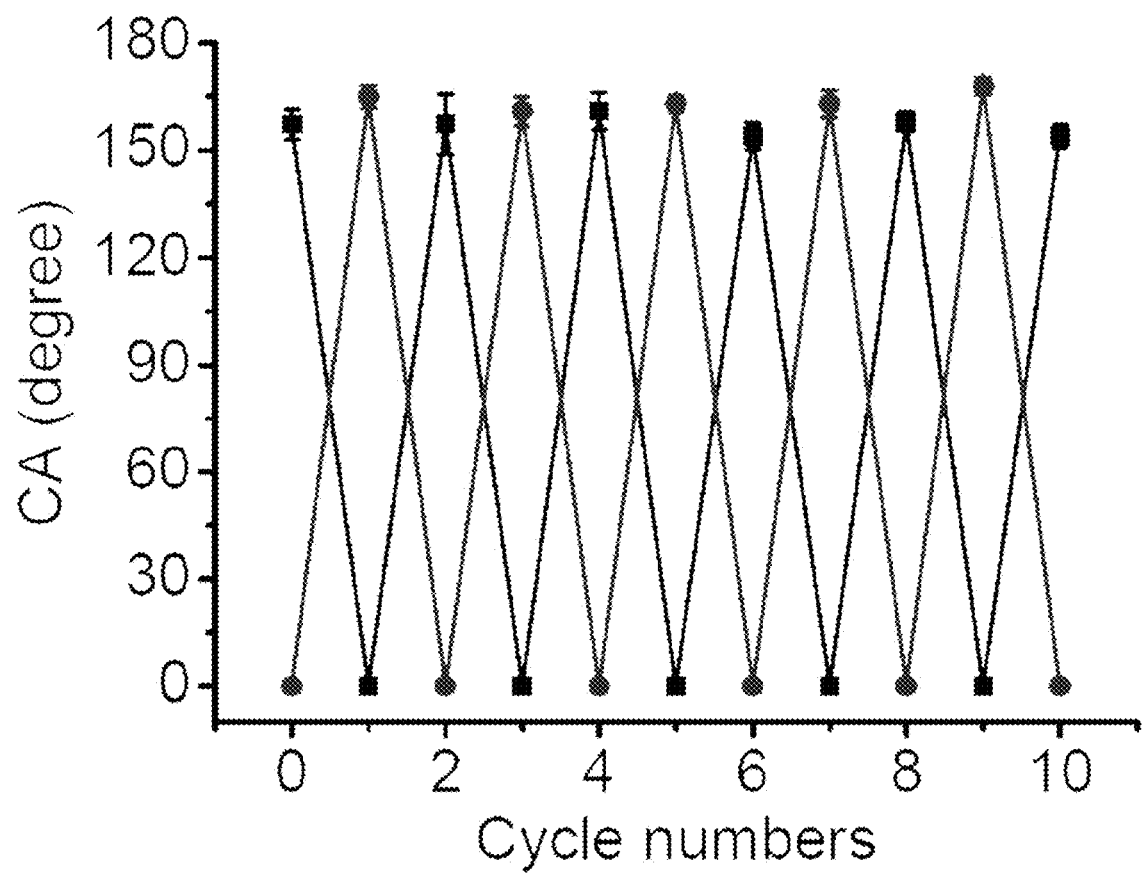
FIG. 6—Reversible surface wettability of the copolymer grafted textiles. Squares: contact angles of water droplets at pH 6.5 (even cycles) and pH 2.0 (odd cycles) in air; circles: contact angles of DCE droplets on the surface in water of pH 6.5 (even cycles) and pH 2.0 (odd cycles).

In some embodiments, e.g., after being rinsed with neutral water and dried, the acid-wetted surface can easily recover its hydrophobic and oleophilic properties in neutral aqueous medium, consistent with switchable oleophobicity and oleophilicity in aqueous media. In some embodiments, the surface properties may be switched reversibly without any significant change in the pH-responsive property of the surface (FIG. 6).

From the results presented in the examples section below, some of the surface-modified membranes and substrates provided herein, including P2VP-b-PDMS grafted textiles, exhibit switchable oleophobicity and oleophilicity in aqueous medium with different pH values. Such surface-modified membranes and substrates are expected to be very useful to membranes and substrates for underwater applications. For example, in some embodiments, it was shown that such surface-modified membranes and substrates can be used for the controllable water/oil separation (FIG. 7). The ease with which the permeability of the block copolymer grafted textile toward oil and water is selectively switched means the same piece of material can be used for different separation purposes.

Oil Spill Cleanup

In some embodiments, the membranes and substrates and methods disclosed herein may be used for the clean-up and/or remediation of oil or hydrocarbon spills and pollution.

An oil spill is the release of a liquid petroleum hydrocarbon into the environment, typically due to human activity. Often the term refers to marine oil spills, where oil is released into the ocean or coastal waters. The oil may be a variety of materials, including crude oil, refined petroleum products, such as gasoline or diesel fuel, oily refuse or oil mixed in waste, or hydrocarbons generally. Oil may also enter the marine environment from natural oil seeps.

The environmental effects include damage to wildlife, water purity and coastal areas. For example, oil will coat the feathers of birds, thereby reducing their insulating ability and make the birds more vulnerable to temperature fluctuations and much less buoyant in the water. Oil also impairs bird flight abilities. As they attempt to preen, birds typically ingest oil that covers their feathers, causing kidney damage, altered liver function, and digestive tract irritation. This and the limited foraging ability quickly causes dehydration and metabolic imbalances. Many birds affected by an oil spill will die unless there is human intervention.

Other marine mammals are affected as well. For example, oil will coat the fur of sea otters and seals, reducing their insulation abilities and leading to body temperature fluctuations and hypothermia. Ingestion of the oil causes dehydration and impaired digestions. Beyond mammals, fish and invertebrates are also typically affected.

Plant and algae species may also be affected by an oil spill. For example, because oil floats on top of water, less sunlight penetrates into the water, limiting the photosynthesis of marine plants and phytoplankton.

By decreasing and disabling flora and fauna populations, part or all of a given coastal and/or marine ecosystem may be affected by an oil spill.

Recovering oil depends upon many factors, including the type of oil spilled, the temperature of the water (in warmer waters, some oil may evaporate), and the types of shorelines and beaches involved.

Both crude oil and natural gas are predominantly a complex mixture of hydrocarbons of various molecular weights, and other organic compounds, that are found in geologic formations beneath the Earth's surface. Under surface pressure and temperature conditions, the lighter hydrocarbons methane, ethane, propane and butane occur as gases, while the heavier ones from pentane and up are in the form of liquids or solids. However, in the underground oil reservoir the proportion which is gas or liquid varies depending on the subsurface conditions, and on the phase diagram of the petroleum mixture.

The majority of hydrocarbons found naturally occur in crude oil, where decomposed organic matter provides an abundance of carbon and hydrogen which, when bonded, can catenate to form seemingly limitless chains. Extracted hydrocarbons in a liquid form are referred to as petroleum or mineral oil. A hydrocarbon is an organic compound consisting entirely of hydrogen and carbon. Aromatic hydrocarbons (arenes), alkanes, alkenes, cycloalkanes and alkyne-based compounds are different types of hydrocarbons. The hydrocarbons in crude oil are mostly alkanes, cycloalkanes and various aromatic hydrocarbons while the other organic compounds contain nitrogen, oxygen and sulfur, and trace amounts of metals such as iron, nickel, copper and vanadium. The exact molecular composition varies widely from formation to formation.

Hydrocarbons are one of the Earth's most important energy resources. The predominant use of hydrocarbons is as a combustible fuel source. In their solid form, hydrocarbons take the form of asphalt. The $C_6$ through $C_{10}$ alkanes, alkenes and isomeric cycloalkanes are the top components of gasoline, naptha, jet fuel and specialized industrial solvent mixtures. With the progressive addition of carbon units, the simple non-ring structured hydrocarbons have higher viscosities, lubricating indices, boiling points, solidification temperatures, and deeper color.

The proportion of light hydrocarbons in the petroleum mixture is typically highly variable between different oil fields and ranges from as much as 97% by weight in the lighter oils to as little as 50% in the heavier oils and bitumens.

In one aspect, the invention provides membranes and substrates that may be used to reduce hydrocarbon pollution to an acceptable level. In some embodiments, the method removes greater than 90%, 95% or 98% of the hydrocarbon from the contaminated site, for example, from water or shoreline.

The methods, membranes and substrates and compositions provided herein may be combined with other cleanup methods, including bioremediation, use of accelerators, controlled burning, use of dispersants or detergents, skimming, use of booms, or use of vacuums.

Bioremediation involves the use of microorganisms or biological agents to break down or remove oil.

Accelerators are hydrophobic chemicals, containing no bacteria, which chemically and physically bond to both soluble and insoluble hydrocarbons. The accelerator acts as a herding agent in water and on the surface, floating molecules to the surface of the water to form gel-like agglomerations.

Controlled burning can effectively reduce the amount of oil in water.

Dispersants and detergents will typically clustering around oil globules and allowing them to be carried away in the water.

Dredging may be used for oils dispersed with detergents and other oils denser than water.

Skimming may be used in combination the methods and compositions disclosed herein. Typically, this requires relatively calm waters.

The present methods and compositions may be combined with booms, which are large floating barriers that round up oil and may lift the oil off the water Vacuums may be used to remove oil from beaches and water surface. Similarly, shovels and other road equipments may be used to clean up oil on beaches.

Definitions

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The term "adsorb" is taken to include both "adsorb" and "absorb" as well as both processes combined.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "contaminate" or contaminated" includes where one substance coats, is mixed with, or is dissolved in, in another substance. Contamination in any of these forms may be partial or complete.

The term "effective," as that term is used in the specification and/or claims, means adequate to accomplish a desired, expected, or intended result.

A "hydrophobic surface" refers to a surface with a water contact angle greater than 90°, while a "hydrophilic surface" refers to a surface with a water contact angle smaller than 80°.

The term "oil" used herein encompasses crude oil, petroleum, as well as refined or fractionated petroleum products and organic materials, including, fats, vegetable oils, fish oils, and animal oils.

"Remove" or "removing" includes effecting any measurable decrease in the substance being removed.

An "oleophobic surface" refers to a surface with an oil contact angle greater than 90°, while an "oleophilic surface" refers to a surface with an oil contact angle smaller than 80°.

When used in the context of a chemical group, "hydrogen" means —H; "hydroxy" means —OH; "oxo" means =O; "halo" means independently —F, —Cl, —Br or —I; "amino" means —NH$_2$ (see below for definitions of groups containing the term amino, e.g., alkylamino).

The term "saturated" as used herein means the compound or group so modified has no carbon-carbon double and no carbon-carbon triple bonds, except as noted below. The term does not preclude carbon-heteroatom multiple bonds, for example a carbon oxygen double bond or a carbon nitrogen double bond. Moreover, it does not preclude a carbon-carbon double bond that may occur as part of keto-enol tautomerism or imine/enamine tautomerism.

The term "alkyl" refers to a monovalent saturated aliphatic group with a carbon atom as the point of attachment, a linear or branched, cyclo, cyclic or acyclic structure, and no atoms other than carbon and hydrogen. Thus, as used herein cycloalkyl is a subset of alkyl. The groups —CH$_3$ (Me), —CH$_2$CH$_3$ (Et), —CH$_2$CH$_2$CH$_3$ (n-Pr), —CH(CH$_3$)$_2$ (iso-Pr), —CH(CH$_2$)$_2$ (cyclopropyl), —CH$_2$CH$_2$CH$_2$CH$_3$ (n-Bu), —CH(CH$_3$)CH$_2$CH$_3$ (sec-butyl), —CH$_2$CH(CH$_3$)$_2$ (iso-butyl), —C(CH$_3$)$_3$ (tert-butyl), —CH$_2$C(CH$_3$)$_3$ (neo-pentyl), cyclobutyl, cyclopentyl, cyclohexyl, and cyclohexylmethyl are non-limiting examples of alkyl groups. The term "haloalkyl" is a subset of substituted alkyl, in which one or more hydrogen has been substituted with a halo group and no other atoms aside from carbon, hydrogen and halogen are present. The groups, —CH$_2$F, —CH$_2$Cl, —CF$_3$, and —CH$_2$CF$_3$ are non-limiting examples of haloalkyl groups.

The term "nitrogen-containing heteroaryl" refers to a monovalent aromatic group with an aromatic carbon atom or nitrogen atom as the point of attachment, said carbon atom or nitrogen atom forming part of an aromatic ring structure wherein at least one of the ring atoms is nitrogen, and wherein the group consists of no atoms other than carbon, hydrogen, aromatic nitrogen, aromatic oxygen and aromatic sulfur. As used herein, the term does not preclude the presence of one or more alkyl group (carbon number limitation permitting) attached to the aromatic ring or any additional aromatic ring present. Non-limiting examples of nitrogen-containing heteroaryl groups include imidazolyl, indolyl, indazolyl (Im), methylpyridyl, oxazolyl, pyridyl, pyrrolyl, pyrimidyl, pyrazinyl, quinolyl, quinazolyl, and quinoxalinyl.

The above definitions supersede any conflicting definition in any of the references that is incorporated by reference herein. The fact that certain terms are defined, however, should not be considered as indicative that any term that is undefined is indefinite. Rather, all terms used are believed to describe the invention in terms such that one of ordinary skill can appreciate the scope and practice the present invention.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Methods and Materials

Materials. Poly(2-vinyl pyridine-b-dimethylsiloxane) block copolymer P5321 (P2VP-b-PDMS 16,000-b-10,000 g/mol) was purchased from Polymer Source, Inc., Canada. 7 nm silica nanoparticles, 1,2-bis(triethoxysilyl)ethane, (3-bromopropyl)tri-methoxysilane, dichloromethane, 1,2-dichloroethane and anhydrous toluene were all purchased from Sigma-Aldrich and used as received. Non-woven clothlike wipes made from cellulose and polypropylene blends were used as received from workwipes. Water purified in a Milli-Q (Millipore) system was used during all the experiments.

Characterization. Air plasma treatment were carried out using PDC-002 plasma cleaner (Harrick Plasma company, US). Scanning electron microscopy (SEM) images were obtained on FEI Magellan scanning electron microscope. Contact angle measurements were performed with an Attension Theta system (KSV Instruments Ltd., Finland) at ambient temperature. Water droplets of 2 µL were used for the water contact angles measurement in air. For the underwater oil contact angles measurements, oil droplets (1,2-dichloroethane, ca. 2 μL) were dropped carefully onto the surface of the samples, which were fixed on the bottom of a glass container filled with water of different pHs. An average CA value was obtained by measuring the same sample at three different positions.

Example 2

Preparation of Poly(2-vinyl pyridine-b-dimethylsiloxane) Modified Material

Figure 2:
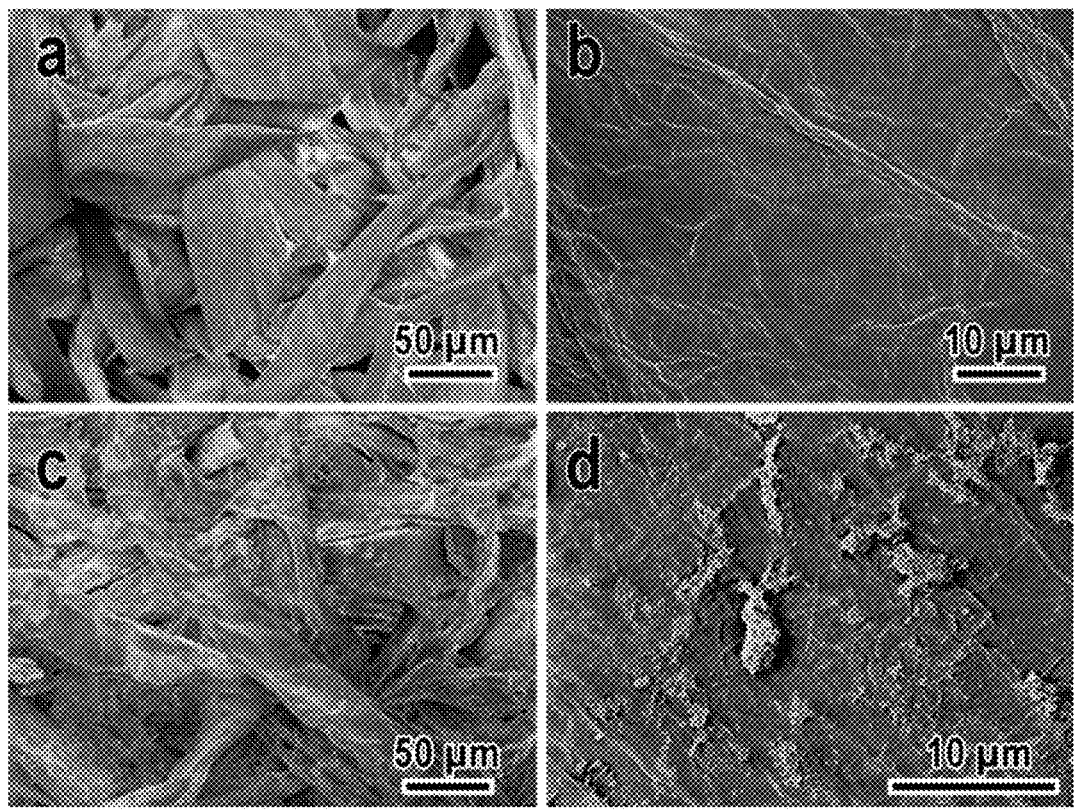
FIGS. 2a-d depict SEM images of the textile fabrics.

The procedure for the preparation of the surface on the textile fabric with switchable oleophilicity and oleophobicity in aqueous medium is schematically illustrated in FIG. 1. To introduce the nanostructures on the surface of the textile fibers, silica nanoparticles were first coated on the textile fabric from a silica sol (20 mL 2% silica nanoparticles (7 nm), 0.5 mL concentrated HCl and 0.5 mL 1,2-bis(triethoxysilyl)ethane). Then the silica nanoparticles deposited on the textile fabric were functionalized with (3-bromopropyl) trimethoxysilane (BPS), which served as the anchoring layer. Finally, the block copolymer of P2VP-b-PDMS was grafted onto the surface through the quaternization reaction between the bromoalkyl groups and the pyridyl groups of the block copolymers. Scanning electrical microscopy (SEM) measurements were carried out to characterize the surface morphologies of the textile surface before and after the functionalization. As shown in FIGS. 2a & b, the raw textile fabric typically consists of ribbon-like fibers with sizes of about 40 μm in width and 5 μm in thickness and the fibers exhibit relatively smooth surfaces. After the silica nanoparticle deposition and the block copolymer grafting, the textile fibers were not changed (FIG. 2c), while clusters of several micrometers could be observed. Enlarged view in FIG. 2d reveals that the surface of the fibers was randomly distributed with nanostructures and microscale clusters which are composed of aggregated nanostructures. These deposited nanostructures and the clusters, along with the underneath inherent microscale fibers, constituted a hierarchically micro- and nanoscale surface roughness, which is believed to amplify the surface wetting properties.

Example 3

Properties of Poly(2-vinyl pyridine-b-dimethylsiloxane) Modified Substrate

Figure 3:
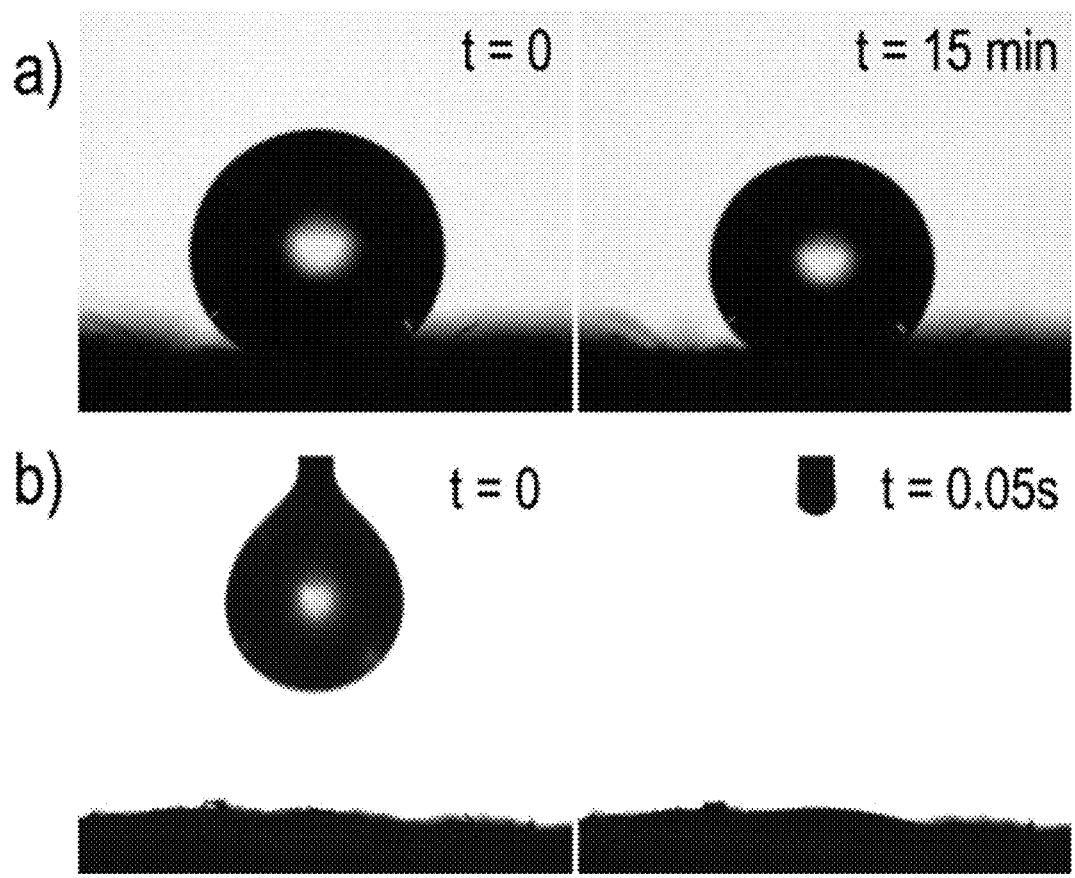
FIGS. 3a & b depict still images from video contact angle measurements for a neutral water droplet (FIG. 2a) and oil droplet (FIG. 2b) applied on the surface in air.

The as-obtained block copolymer-grafted surface is of a relatively low free-energy and high roughness and its wettability is thereby evaluated by contact angle measurements. For the as-prepared block copolymer grafted textile surface in air, the neutral (pH ~6.5) water droplet formed a sphere with a contact angle of 157.2±4.2°, as shown in the left panel of FIG. 3a, indicating a hydrophobic surface for neutral water. After 15 min of exposure to ambient air, the water droplet remained its spherical form in spite of shrinkage due to the evaporation induced total volume reduction indicating that the as-prepared surface is stable to neutral water. Moreover, as the raw untreated textile fabric exhibits a hydrophilic surface property, the hydrophobicity of the as-prepared surface demonstrates a successful grafting of the block copolymer, which lowers the surface energy of the surface. The oil wettability of the as-prepared surface in air was also tested by using 1,2-dichloroethane (DCE) droplet as an indicator. As shown in FIG. 3b, as soon as the oil droplet contacted the surface of the textile, it completely spread over the surface within 50 ms, indicating the oleophilicity of the as-prepared surface.

Figure 4:
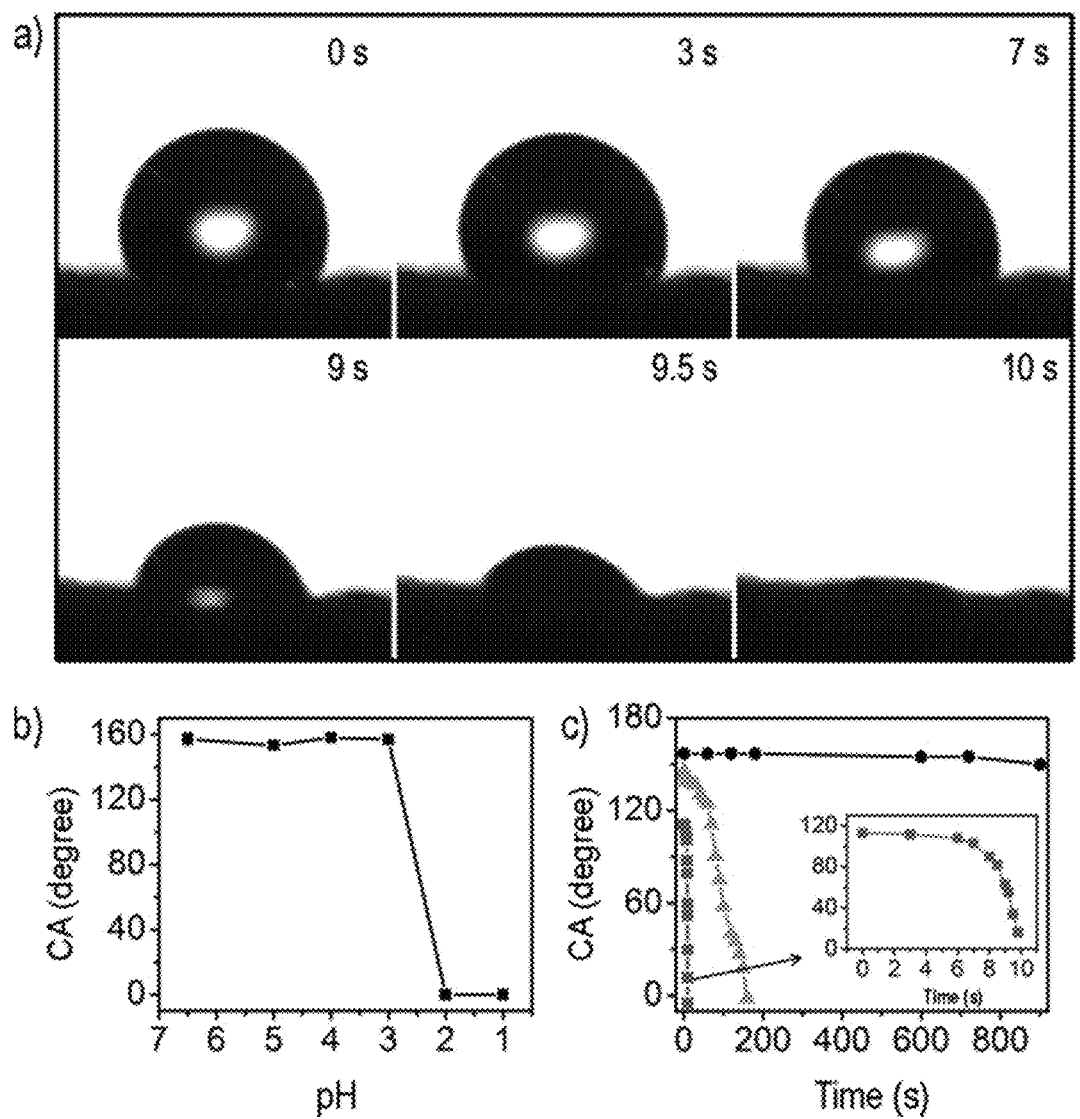
FIGS. 4a-c.

P2VP, a weak polybase (p$K_a$~4.7), exhibits pH-dependent wettability, being hydrophobic at high pHs but hydrophilic at low pHs, owing to protonation and deprotonation processes of pyridyl groups. As shown in FIG. 4a, when an acidic water droplet (pH 1.0) was applied on the P2VP-b-PDMS grafted textile fabric surface in air, it gradually spread out completely within about 10 seconds and wetted the textile, indicating the hydrophilicity of the surface to acidic water. The acid-exposed surface can recover its hydrophobicity easily by rinsing with neutral water and then drying with $N_2$ flow and this process can be quickly finished at room temperature within 2 minutes and does not involve the use of extreme heating temperature or solvent treatment. This is mainly because that the PDMS segment in the block copolymer has a low glass transition temperature (Tg, ca. −62° C. according to the supplier) and thus it owns a high flexibility and thus can be considered as a liquid polymer at ambient temperature. Therefore, and without being bound by theory, it is expected that, upon drying, the PDMS segments, which are more hydrophobic than the P2VP segments, spontaneously stretch and move to the exterior of the grafted block copolymer, which recovers the hydrophobicity of the prepared surface. FIGS. 4b & c present wetting behaviors of water droplets with different pHs on the block copolymer grafted textile. It is observed that the block copolymer grafted textile could be fully wetted by water with pH=2.0 within 160 seconds, but is stably hydrophobic to water of pH≥3.0. Clearly, the water droplet with pH 1 wets the prepared surface much faster than that with pH 2. A clear-cut, abrupt switch of surface water wettability within a small pH range makes this material desirable for many applications.

These results confirm that P2VP-b-PDMS grafted textile exhibits tunable wetting behavior to water, depending on water pH, switching between hydrophobicity and hydrophilicity. The switchable water wettability of the surface is expected to affect its oil wettability in aqueous media. FIG. 5 presents the oil wettability of the P2VP-b-PDMS grafted textile under water of different pH values, with DCE representing an oil phase. As shown in FIG. 5a, as soon as the DCE droplet touched the surface of the block copolymer grafted textile, which was immersed in water of pH 6.5, it immediately diffused into the textile within 0.12 s, indicating a oleophilic property of the surface in pH neutral aqueous medium. FIG. 5b shows an underwater oil uptake process by the block copolymer grafted textile. The oil red stained DCE droplets were dropped at the bottom of the beaker containing water of pH 6.5, and then a piece of the block copolymer grafted textile was lowered down to approach the DCE droplets. On contact, the textile immediately sucked up the DCE droplets without leaving behind any residues. This simple experiment reveals that the block copolymer grafted materials are promising sorbents for removing oil from water.

As discussed above, the surface prepared by the method described above is hydrophobic to water at pH≥3, which means the surface is nonwettable in these aqueous media. As a result, when the block copolymer grafted textile is immersed in neutral water, the surface is still covered with the oleophilic PDMS chains, and therefore once an oil droplet contacts the surface, oil wets the surface preferentially over water owing to the oleophilic surface property (FIG. 5c). Additionally, it was found that the surface was still oleophilic even after 24 h of immersion in water of pH 6.5, which demonstrates that the oleophilic property of the prepared surface is relatively stable under pH neutral aqueous media.

On the other hand, it has been reported that air can be trapped inside the rough grooves of the hydrophobic surface under water. The as-prepared block copolymer grafted textile surface is hydrophobic in air. In some embodiments, air will be trapped inside the grooves when the rough surface is immersed in water. A complex interfacial system, i.e., a four phase system (air-solid-oil-water), will then be formed when an oil droplet contacts such a surface.

In contrast to neutral water, when the textile was immersed in acidic water with pH of 2.0, the oil wettability of the surface reversed completely. As shown in FIG. 5d, the DCE contact angle was 165.3° in the acidic water, indicating the oleophobicity of the block copolymer grafted textile in acidic water. FIG. 5d shows a photograph of DCE droplets sitting on the surface of the textile under acidic water, and clearly the textile was non-wettable to oil. As has been discussed above, the block copolymer grafted surface can be turned into hydrophilic due to the protonation of pyridyl groups in acidic water, and thus when immersed in acidic water, water can easily wet the surface and diffuse into micro- and nanostructures of the textile, forming a water trapped composite interface. In some embodiments, this new composite interface contributes to the oleophobic property of the surface under water (FIG. 5f).

After being rinsed with neutral water and dried with $N_2$ flow, the acid-wetted surface can easily recover its hydrophobic and oleophilic properties in neutral aqueous medium, thus suggesting its switchable oleophobicity and oleophilicity in aqueous media. It turns out that the reversible cycle of the surface wettability (both in air and aqueous media) can be repeated for many times without any change in the pH-responsive property of the surface (FIG. 6).

To better understand the switching of the oil wettability on the block copolymer grafted surface in different aqueous media, equation (1) derived from Young's equation can be employed to depict the contact angle of an oil on flat surface in the existence of water bulk phase:

$$\cos\theta_{ow} = \frac{\gamma_{oa}\cos\theta_{oa} - \gamma_{wa}\cos\theta_{wa}}{\gamma_{ow}} \quad (1)$$

where $\gamma_{oa}$, $\gamma_{wa}$, and $\gamma_{ow}$ are surface tensions of the oil/air, water/air, and oil/water interfaces, respectively. $\theta_{ow}$, $\theta_{oa}$, and $\theta_{wa}$ are the contact angle of oil in water, oil in air, and water in air, respectively. According to this equation, it can be seen that the contact angle of oil in water can be adjusted by tuning the $\theta_{oa}$ and $\theta_{wa}$. Taking DCE as an example, its interfacial tension with air ($\gamma_{oa}$) is 24.15 mNm$^{-1}$, and the water surface tension ($\gamma_{wa}$) is 73.0 mNm$^{-1}$. The DCE/water interfacial tension ($\gamma_{ow}$) is 28.1 mNm$^{-1}$. In air the DCE contact angle on the block copolymer grafted smooth surface ($\theta_{oa}$) was 13.5°. However, for water with different pH values, the contact angle in air can be changed from 91.2° (pH 6.5) to 52.1° (pH 2.0), due to the pH-tunable wettability of P2VP chains. As a result from equation (1), the oil contact angle in these aqueous media are 27° (pH 6.5) and 139.5° (pH 2.0), indicating the switching of the wettability from oleophilicity to oleophobicity. The calculated results are consistent with the experimental results where the flat surface (i.e., silicon wafer) with the grafted block copolymer showed oil contact angles of ca. 36° in water of pH 6.5 and 138° in water of pH 2.0, respectively. As for the grafted block copolymer grafted textiles, their hierarchical micro- and nanostructures further amplified their oil wettability making them oleophilic and oleophobic surfaces in different aqueous media.

From the above results, the P2VP-b-PDMS grafted textiles exhibit switchable oleophobicity and oleophilicity in aqueous medium with different pH values. Such a smart surface is expected to be very useful to materials for underwater applications.

Example 4

Underwater Application of Poly(2-vinyl pyridine-b-dimethylsiloxane) Modified Substrate As an example of an application, it was shown that these P2VP-b-PDMS grafted textiles can be used for the controllable water/oil separation. The P2VP-b-PDMS grafted textiles were fixed between two glass tubes as a separation membrane. The simple oil/water separation setup is shown in FIG. 7. A mixture of commercial gasoline and pH neutral water was poured into the upper glass tube, and, due to the oleophilicity and hydrophobicity of the textile surface, only gasoline quickly passed through the textile and water could not and thus was retained on top of the textile in the upper glass tube (FIG. 7a). However, when the textile was first simply wetted by an acidic water (pH<2) (without drying) and then used under otherwise same conditions, an inversed water/oil separation process was realized. As shown in FIG. 7b, in this case, water, which is neutral pH, in the mixture selectively passed through the textile quickly, leaving behind the gasoline retained in the upper tube. The ease with which the permeability of the block copolymer grafted textile toward oil and water is selectively switched means the same piece of material can be used for different separation purposes.

Example 5

Polyurethane-based Poly(2-vinyl pyridine-b-dimethylsiloxane) Modified Substrate

A three-dimensional porous polyurethane foam was employed as a substrate for the P2VP-b-PDMS grafting according to the same procedure as detailed in Example 2 above. The modified foams exhibit oleophilicity in neutral aqueous medium, and can be easily switched into oleophobic when wetted by acidic water. FIGS. 8a & b shows the oil capture and release process by the functionalized foam. DCE of about 2 mL stained with oil red dye was dropped into neutral water, and a functionalized foam was held to approach the DCE phase in water, and upon contact, the DCE was quickly sucked up by the foam without any residues left behind (FIG. 8a & b). Moreover, the absorbed oil can be easily released from the foam when the oil-loaded foam was transferred into an acidic water (pH 2.0) with gentle shaking and squeezing (FIG. 8c), which is caused by the switching of the surface wettability from oleophobicity to oleophilicity. After washing with neutral water and drying, the foam can recover its oleophilic property and can be used for oil removal again. Thus, the material is recyclable, reducing oil cleanup cost significantly.

Example 6

Core-Shell Nanostructure-based Poly(2-vinyl pyridine-b-dimethylsiloxane) Modified Substrate Core-shell nanostructures, with $Fe_3O_4$ magnetic nanoparticles being the core and mesoporous silica being the shell, were employed as substrate and were modified with P2VP-b-PDMS to prepare responsive functionalized nanoparticles (FIGS. 9a and 9b). The liquid marbles were prepared by encapsulating water droplets with the responsive functionalized nanoparticles (FIG. 9c). The such-prepared liquid marbles have a pH-responsive rupture behavior (FIG. 9c). The mesoporous shell of the functionalized nanoparticles were further loaded with photo-acid generator (PAG) (FIG. 9d). The liquid marble prepared using the PAG-loaded functionalized nanoparticles rupture under UV illumination (FIG. 9d), avoiding the requirement of adjusting the bulk pH of the system. Due to the magnetic core materials of the functionalized nanoparticles, the thus-prepared liquid marbles can be remotely manipulated by an external magnetic field (FIG. 9c). We envision that the potential applications of such remotely controllable liquid marbles based on the surface-modified nanostructures will include smart delivery of water-soluble agents to initiate chemical reactions on demand, channel-free microfluidic systems, and sensors with visual indication capability.

* * *

All of the materials and methods disclosed and claimed herein can be made and executed without undue experimentation in light of the present disclosure. While the materials and methods of this invention have been described in terms of preferred embodiments, it will be apparent to those of skill in the art that variations may be applied to materials and to the methods and in the steps or in the sequence of steps of the method described herein without departing from the concept, spirit and scope of the invention. More specifically, it will be apparent that certain agents which are both chemically and/or structurally related may be substituted for the agents described herein while the same or similar results would be achieved. All such similar substitutes and modifications apparent to those skilled in the art are deemed to be within the spirit, scope and concept of the invention as defined by the appended claims.

The invention claimed is:

1. A surface-modified material for removing oil from water comprising a substrate having a plurality of embedded silica or metal oxide nanostructures; wherein the nanostructures are covalently bonded to a polymer through a quaternized amine such that the surface of the surface-modified material is oleophilic and/or hydrophobic at a first condition and oleophobic and/or hydrophilic at a second condition, and wherein the polymer comprises a block copolymer with (a) at least one wettability-responsive block and (b) at least one hydrophobic and oleophilic block, wherein the wettability responsive block is polypyrrole, poly(2-vinylpyridine), or poly(4-vinylpyridine), wherein the substrate has a different chemical composition than the polymer.

2. The surface-modified material of claim 1, wherein the surface-modified material is oleophilic in aqueous media at a first condition and oleophobic in aqueous media at a second condition.

3. The surface-modified material of claim 1, wherein the surface-modified material is oleophilic in air at a first condition and oleophobic in air at a second condition.

4. The surface-modified material of claim 1, wherein the first and second conditions are selected from the group consisting of a certain temperature, voltage, pH, illuminance, pressure, and a combination thereof.

5. The surface-modified material of claim 1, wherein the nanostructures comprise nanoparticles, nanowires, nanorods, nanobelts, nanotubes, layered nanostructures, or a combination thereof.

6. The surface-modified material of claim 5, wherein the nanostructures have an average size from around 1 nm to 10 μm.

7. The surface-modified material of claim 1, wherein the hydrophobic block is poly(acrylonitrile), poly(phenyl methyl siloxane), polystyrene, poly(4-dimethylsilyl styrene), poly(4-methyl styrene), poly(dimethyl siloxane), polyethylene, polypropylene, poly(isobutylene), polyamide, or poly(vinylidene fluoride).

8. The surface-modified material of claim 1, wherein the at least one hydrophobic block is a hydrophobic homogenous polymer.

9. The surface-modified material of claim 8, wherein the hydrophobic homogenous polymer is poly(acrylonitrile), poly(phenyl methyl siloxane), polystyrene, poly(4-dimethylsilyl styrene), poly(4-methyl styrene), poly(dimethyl siloxane), polyethylene, polypropylene, poly(isobutylene), polyamide, or poly(vinylidene fluoride).

10. The surface-modified material of claim 1, wherein the substrate comprises a textile, a membrane, a polymer foam, a metal mesh, a metal foam, paper, glass, or nanostructures.

11. The surface-modified material of claim 10, wherein the textile, membrane, paper, metal mesh, metal foam or polymer foam has an average pore size in the range from 10 nm to 5,000 μm.

12. The surface-modified material of claim 1, wherein the substrate comprises a nonporous solid.

13. The surface-modified material of claim 10, wherein the substrate comprises the textile, membrane, or polymer foam, wherein the textile, membrane, or polymer foam comprises cellulose, nylon, polyester, polyethylene terephthalate, polyurethane polylactide, polypropylene, polyethylene, polysulfone, polyamide, polyvinyl chloride, polytetrafluoroethylene, polycarbonate, polyacrylonitrile, polybutylene terephthalate, polyimide, polymethyl methacrylate, polyetheretherketone, polyetherketone, polyetherimide, polyethersulfone, polymethylpentene, polyoxymethylene, polyphthalamide, polyphenylene oxide, polyphenylene sulfide, ethylene propylene rubber, styrene butadiene rubber, ethylene propylene diene monomer rubber, chitosan, alginate, gelatin, poly(N-isopropylacrylamide), polydimethylsiloxane, poly(phenyl methyl siloxane), poly(4-dimethylsilyl styrene), poly(4-methyl styrene), poly(isobutylene), poly(N-isopropylacrylamide), polyacrylamide, polyaniline, poly(acrylic acid), poly(methylacrylic acid), poly(2-(diethylamino)ethylmethacrylate, poly(methacryloyl ethylene phosphate), poly[2-(methacryloyloxy)ethyl]-dimethyl(3-sulfopropyl)ammonium hydroxide, poly[2-(methacryloyloxy)-ethyl-trimethylammonium chloride], polyvinylpyrrolidone, or mixtures or blends thereof.

14. The surface-modified material of claim 10, wherein the substrate comprises the metal mesh or metal foam, wherein the metal mesh or metal foam comprises metal, metal oxide of the metal, metal chloride of the metal, metal hydroxide of the metal, alloy of the metals, hybrids of the metal oxides, hybrids of the metal chlorides, or hybrids of the metal hydroxides.

15. The surface-modified material of claim 14, wherein the metal mesh or metal foam comprises metal, wherein the metal comprises at least one of copper, iron, nickel, titanium, zinc, aluminum, silver, gold, palladium, platinum, silicon, vanadium, zirconium, cobalt, lead, chromium, barium, manganese, magnesium, yttrium, hafnium, thallium, indium, tin, arsenic, selenium, tellurium, bismuth, gallium, germanium, cadmium, iridium, tungsten, tantalum, niobium, molybdenum, strontium, calcium, an alloy thereof, an oxide thereof, or a mixture thereof.

16. The surface-modified material of claim 12, wherein the nonporous solid comprises cellulose, nylon, polyester, polyethylene terephthalate, polyurethane polylactide, polypropylene, polyethylene, polysulfone, polyamide, polyvinyl chloride, polytetrafluoroethylene, polycarbonate, polyacrylonitrile, polybutylene terephthalate, polyimide, polymethyl methacrylate, polyetheretherketone, polyetherketone, polyetherimide, polyethersulfone, polymethylpentene, polyoxymethylene, polyphthalamide, polyphenylene oxide, polyphenylene sulfide, ethylene propylene rubber, styrene butadiene rubber, ethylene propylene diene monomer rubber, chitosan, alginate, gelatin, poly(N-isopropylacrylamide), polydimethylsiloxane, poly(phenyl methyl siloxane), poly(-dimethylsilyl styrene), poly(4-methyl styrene), poly(isobutylene), poly(N-isopropylacrylamide), polyacrylamide, polyaniline, poly(acrylic acid), poly(methylacrylic acid), poly(2-(diethylamino)ethylmethacrylate, poly(methacryloyl ethylene phosphate), poly[2-(methacryloyloxy)ethyl]-dimethyl(3-sulfopropyl)ammonium hydroxide, poly[2-(methacryloyloxy)-ethyl-trimethylammonium chloride], polyvinylpyrrolidone, or mixtures or blends thereof.

17. The surface-modified material of claim 1, wherein the polymer was bonded to the substrate through a grafting to and/or grafting from process.

18. The surface-modified material of claim 17, wherein the grafting from process comprises atom transfer radical polymerization or reversible addition-fragmentation chain transfer polymerization.

19. The surface-modified material of claim 17, wherein the grafting to process comprises functionalized polymer molecules reacting with complementary functional groups located on the substrate surface to form tethered chains.

20. The surface-modified material of claim 19, wherein the functional groups of the functionalized polymer molecules comprise amino groups, pyridyl groups, carboxy groups, and/or hydroxy groups.

21. The surface-modified material of claim 19, wherein the complementary functional groups located on the substrate surface comprise epoxy groups, amino groups, carboxy groups, hydroxy groups, and/or haloalkyl groups.

22. The surface-modified material of claim 19, wherein the complementary functional groups are introduced on the substrate surface by a silanization reaction between a silane and the substrate.

23. The surface-modified material of claim 22, wherein the silane comprises an epoxy group, amino group, carboxy group, hydroxyl group, and/or haloalkyl group.

24. The surface-modified material of claim 10, wherein the nanostructures have an average size between 1 nm and 100 µm.

25. The surface-modified material of claim 1, wherein the the nanostructures are porous.

26. The surface-modified material of claim 25, wherein the pore size of the porous nanostructures is between 0.1 nm to 200 nm.

27. The surface-modified material of claim 1, wherein the nanostructures comprise core-shell nanostructures.

28. The surface-modified material of claim 27, wherein the core-shell structures comprise a magnetic core and a shell.

29. The surface-modified material of claim 28, wherein the shell is porous.

30. The surface-modified material of claim 29, wherein the pore size of the porous shell is porous between 0.3 nm to 200 nm.

31. The surface-modified material of claim 28, wherein the shell is nonporous.

32. The surface-modified material of claim 27, wherein the core of the core-shell nanostructures comprises one or more of silica, metal, metal oxide, and a polymer.

33. The surface-modified material of claim 27, wherein the shell of the core-shell nanostructures comprises one or more of silica, metal, metal oxide, and a polymer.

34. The surface-modified material of claim 1, wherein the nanostructures comprise one or more polymers selected from cellulose, nylon, polyester, polyethylene terephthalate, polyurethane polylactide, polypropylene, polyethylene, polysulfone, polyamide, polyvinyl chloride, polytetrafluoroethylene, polycarbonate, polyacrylonitrile, polybutylene terephthalate, polyimide, polymethyl methacrylate, polyetheretherketone, polyetherketone, polyetherimide, polyethersulfone, polymethylpentene, polyoxymethylene, polyphthalamide, polyphenylene oxide, polyphenylene sulfide, ethylene propylene rubber, styrene butadiene rubber, ethylene propylene diene monomer rubber, chitosan, alginate, gelatin, poly(N-isopropylacrylamide), polydimethylsiloxane, poly(phenylmethylsiloxane), poly(4-dimethylsilyl styrene), poly(4-methyl styrene), poly(isobutylene), poly(N-isopropyl acrylamide), polyacrylamide, polyaniline, poly(acrylic acid), poly(methylacrylic acid), poly(2-(diethylamino)ethylmethacrylate, poly(methacryloyl ethylene phosphate), poly[2-(methacryloyloxy)ethyl]-dimethyl(3-sulfopropyl)ammonium hydroxide, poly[2-(methacryloyloxy)-ethyl-trimethylammonium chloride], and polyvinylpyrrolidone.

35. The surface-modified material of claim 27, wherein the core-shell nanostructures comprise one or more polymers selected from cellulose, nylon, polyester, polyethylene terephthalate, polyurethane polylactide, polypropylene, polyethylene, polysulfone, polyamide, polyvinyl chloride, polytetrafluoroethylene, polycarbonate, polyacrylonitrile, polybutylene terephthalate, polyimide, polymethyl methacrylate, polyetheretherketone, polyetherketone, polyetherimide, polyethersulfone, polymethylpentene, polyoxymethylene, polyphthalamide, polyphenylene oxide, polyphenylene sulfide, ethylene propylene rubber, styrene butadiene rubber, ethylene propylene diene monomer rubber, chitosan, alginate, gelatin, poly(N-isopropylacrylamide), polydimethylsiloxane, poly(phenyl methyl siloxane), poly(4-dimethylsilyl styrene), poly(4-methyl styrene), poly(isobutylene), poly(N-isopropyl acrylamide), polyacrylamide, polyaniline, poly(acrylic acid), poly(methylacrylic acid), poly(2-(diethylamino)ethylmethacrylate, poly(methacryloyl ethylene phosphate), poly[2-(methacryloyloxy)ethyl]-dimethyl(3-sulfopropyl)ammonium hydroxide, and poly[2-(methacryloyloxy)-ethyl-trimethylammonium chloride].

36. The surface-modified material of claim 27, wherein the core-shell nanostructures comprise one or more of silica, metal, metal oxide, and a polymer.

37. The surface-modified material of claim 29, wherein the porous shells are loaded with light-sensitive substances in their pore space.

38. The surface-modified material of claim 36, wherein the core-shell nanostructures are loaded with light-sensitive substances in their shell and/or core space.

39. The surface-modified material of claim 25, wherein the porous nanostructures are loaded with light-sensitive substances in their pore space.

40. The surface-modified material of claim 27, wherein the core-shell nanostructures are loaded with light-sensitive substances in their shell and/or core space.

41. The surface-modified material of claim 37, wherein the light-sensitive substances comprise photoacid generators, photoinitiators, photobase generators, photocatalysts, or mixtures or blends thereof.

42. The surface-modified material of claim 41, wherein the light-sensitive substances comprise photoacid generators, wherein the photoacid generator comprises bis(4-tert-butylphenyl)iodonium perfluoro-1-butanesulfonate, bis(4-tert-butylphenyl)iodonium p-toluenesulfonate, bis(4-tert-butylphenyl)iodonium triflate, boc-methoxyphenyldiphenyl sulfonium triflate, (4-bromophenyl)diphenylsulfonium triflate, (tert-butoxycarbonylmethoxynaphthyl)-diphenylsulfonium triflate, (4-tert-butylphenyl)diphenylsulfonium triflate, diphenyliodonium 9,10-dimethoxyanthracene-2-sulfonate, diphenyliodonium hexafluorophosphate, diphenyliodonium nitrate, diphenyliodonium perfluoro-1-butanesulfonate, diphenyliodonium p-toluenesulfonate, diphenyliodonium triflate, (4-Fluorophenyl)diphenylsulfonium triflate, N-hydroxynaphthalimide triflate, N-hydroxy-5-norbornene-2,3-dicarboximide perfluoro-1-butanesulfonate, (4-iodophenyl) diphenyl sulfonium triflate, (4-methoxyphenyl) diphenylsulfonium triflate, 2-(4-methoxystyryl)-4,6-bis (trichloromethyl)-1,3,5-triazine, (4-methylphenyl) diphenylsulfonium triflate, (4-methylthiophenyl)methyl phenyl sulfonium triflate, (4-phenoxyphenyl)diphenylsulfonium triflate, (4-phenylthiophenyl)diphenylsulfonium triflate, triphenylsulfonium triflate, or mixtures or blends thereof.

43. The surface-modified material of claim 41, wherein the light-sensitive substances comprise the photoinitiator, wherein the photoinitiator comprises azobisisobutyronitrile, benzoyl peroxide, or mixtures or blends thereof.

44. The surface-modified material of claim 41, wherein the light-sensitive substances comprise the photobase generator, wherein the photobase generator comprises malachite green carbinol base.

45. The surface-modified material of claim 41, wherein the light-sensitive substances comprise the photocatalyst, wherein the photocatalyst comprises $TiO_2$, ZnO, $SnO_2$, $ZrO_2$, CdS, ZnS, $WO_3$, SiC, Si, InP, GaP, CuO, $Cu_2O$, CdTe, CdSe, $Fe_2O_3$, $In_2O_3$, $In_2S_3$, CuS, PbS, PbO, $Si_3N_4$, GaAs, GaN, AlGaInP, SiGe, or AlGaAs.

46. A boom for absorbing a hydrocarbon comprising a surface-modified material including a substrate having a plurality of embedded silica or metal oxide nanostructures, wherein the nanostructures are covalently bonded to a polymer through a quaternized amine such that the surface of the surface-modified material is oleophilic and/or hydrophobic at a first condition and oleophobic and/or hydrophilic at a second condition, and wherein the polymer comprises a block copolymer with (a) at least one wettability-responsive block and (b) at least one hydrophobic and oleophilic block, wherein the wettability responsive block comprises a nitrogen-containing heteroaryl group.

47. The boom of claim 46, wherein the wettability responsive block comprises a polypyrrole, poly(2-vinylpyridine), or poly(4-vinylpyridine) or wherein the nitrogen-containing heteroaryl group is a pyridyl group.

* * * * *